(12) United States Patent
Cherian et al.

(10) Patent No.: US 8,595,343 B2
(45) Date of Patent: Nov. 26, 2013

(54) SYSTEM AND METHOD FOR SHARING STORAGE RESOURCES

(75) Inventors: Jacob Cherian, Austin, TX (US); Don H. Walker, Georgetown, TX (US)

(73) Assignee: Dell Products, LP, Round Rock, TX (US)

( * ) Notice: Subject to any disclaimer, the term of this patent is extended or adjusted under 35 U.S.C. 154(b) by 445 days.

(21) Appl. No.: 12/271,393

(22) Filed: Nov. 14, 2008

(65) Prior Publication Data

US 2010/0125653 A1 May 20, 2010

(51) Int. Cl.
*G06F 15/173* (2006.01)

(52) U.S. Cl.
USPC ........... 709/223; 709/249; 709/250; 709/236; 709/238; 370/351; 370/357; 370/395; 710/301; 710/316; 710/104

(58) Field of Classification Search
USPC .......... 709/223, 249, 250, 236, 238; 370/351, 370/357, 395; 710/301, 316, 104
See application file for complete search history.

(56) References Cited

U.S. PATENT DOCUMENTS

| | | | | |
|---|---|---|---|---|
| 7,454,552 | B2 * | 11/2008 | Stewart et al. | 710/315 |
| 2006/0018341 | A1 * | 1/2006 | Pettey et al. | 370/465 |
| 2006/0242354 | A1 * | 10/2006 | Johnsen et al. | 710/316 |
| 2008/0294829 | A1 * | 11/2008 | Khatri et al. | 710/301 |
| 2009/0119432 | A1 * | 5/2009 | Lee et al. | 710/113 |
| 2009/0248947 | A1 * | 10/2009 | Malwankar et al. | 710/316 |
| 2010/0017549 | A1 * | 1/2010 | Harriman | 710/104 |

OTHER PUBLICATIONS

PCI SIG. "PCI SIG Training Materials" 2008, 13 pages <http://www.pcisig.com/developers/main/training_materials/>.
Krause, Michael et al. "I/O Virtualization and Sharing" 2006, PCI-SIG, 23 pages <http://www.pcisig.com/developers/main/training_materials/get_document?doc_id=0cd682cb65b452d00e2047287b48369fc0d9bfa6>.
Krause, Michael. Alternative Requested ID Interpretation (ARI), Apr. 2006, PCI-SIG, 14 pages <http://www.pcisig.com/developers/main/training_materials/get_documentdoc_id=3233af1285a8e3a5455d58571736a1 fbed85d0ab>.
Pettey, Chris. "Multi-Root Overview" Apr. 2006, PCI-SIG, 31 pages <http://www.pcisig.com/developers/main/training_materials/get_documentdoc_id=656dc1d4f27b8fdca34f583bd c9437627bc3249f>.
"Neterion Upgrades 'Virtualisation-Aware Network Adapters'" Feb. 25, 2008, Virtualization.com, 6 pages <http://virtualization.com/news/2008/02/25/neterion-upgrades-virtualisation-aware-network-adapters/>.

* cited by examiner

*Primary Examiner* — Thuong Nguyen
(74) *Attorney, Agent, or Firm* — Larson Newman, LLP (57) ABSTRACT

A network includes a management module with a first root complex, a first server with a first endpoint coupled to the first root complex, and a second server with a second root complex, a second endpoint coupled to the second root complex, a third endpoint coupled to the first root complex, and a bridge coupled to the second endpoint and to the third endpoint. A method includes discovering a PCIe host bridge adapter (PHBA) and a storage resource coupled to multiple storage extents in a PCIe domain, creating a first virtual function on the storage resource and sending a first identifier for the first virtual function to the PHBA. A network interface device includes a PCIe endpoint that is coupleable to a PCIe root complex, another PCIe endpoint that is coupleable to another PCIe root complex, and a bridge that couples the first PCIe endpoint with the second PCIe endpoint.

14 Claims, 3 Drawing Sheets

SYSTEM AND METHOD FOR SHARING STORAGE RESOURCES

FIELD OF THE DISCLOSURE

This disclosure relates generally to information handling systems, and relates more particularly to sharing storage resources among information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, data storage systems, and networking systems.

Virtualization of resources in an information handling system is a process whereby the physical characteristics of a particular resource are made to appear differently by a software agent. For example, in platform virtualization, a host program creates a simulated computer environment, called a virtual machine. The virtual machine permits guest software to run on an information handling system as if the guest software were being run on a separate information handling system. Typically, several virtual machines run simultaneously on a single information handling system, such as when several operating systems are running on the same information handling system. Different virtual machines (e.g., different operating systems) may use Input/Output (I/O) devices differently, and so virtualization also involves I/O virtualization. For example, a single hard disk drive can be partitioned into several virtual disks, each utilizing a different file system.

The Peripheral Component Interconnect-Express (PCIe) standard for connecting resources to an information handling system includes a Single Root I/O Virtualization (SR-IOV) mechanism, whereby a particular PCIe device can be accessed by several virtual machines on the same information handling system. An SR-IOV enabled PCIe device includes a physical function that is directly accessible to the information handling system. The SR-IOV enabled PCIe device also includes the ability to create one or more virtual functions that can be associated with different virtual machines. In this way, a single I/O resource can be accessed by the different virtual machines without creating contention within the I/O resource.

A server-based system typically includes several information handling systems and shared data storage resources. While the PCIe standard is a desirable way to couple information handling systems to data storage resources, the SR-IOV mechanism does not permit more than one information handling system to access a data storage resource. That is, SR-IOV does not permit sharing of resources between different information handling systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch or router, a wireless router, or another network communication device, or any other suitable device, and can vary in size, shape, performance, functionality, and price. An information handling system can also include a set of any of the foregoing devices.

The information handling system can include memory (volatile (e.g. random access memory (RAM), etc.), nonvolatile (read only memory (ROM), flash memory, etc.), or any combination thereof), one or more processing resources, such as a central processing unit (CPU), hardware, firmware, or software control logic, or any combination thereof. Additional resources of the information handling system can include one or more storage devices, one or more communications ports for communicating with external devices, as well as various input and output (I/O) devices, such as a keyboard, a mouse, a video display, or any combination thereof. The information handling system can also include one or more buses operable to transmit communications between the various hardware resources. Portions of an information handling system may themselves be considered information handling systems.

Portions of an information handling system, when referred to as a "device," a "module," or the like, may be configured as hardware, firmware, software, or any combination thereof. For example, a device or a module may be hardware. A non-limiting example of a device or a module implemented as hardware includes: an integrated circuit (e.g., an Application Specific Integrated Circuit (ASIC), a Field Programmable Gate Array (FPGA), a structured ASIC, or a device embedded on a larger chip), a card (e.g., a Peripheral Component Interface (PCI) card, a PCI-Express (PCIe) card, a Personal Computer Memory Card International Association (PCMCIA) card, or other such expansion card), or a system (e.g., a motherboard, a system-on-a-chip (SoC), or a stand-alone device). Similarly, the device or module can be firmware (i.e., any software running on an embedded device, a central processing unit, or other such device) or software (i.e., any software capable of operating in the relevant environment). The device or module can also be a combination of any of the foregoing examples of hardware, firmware, or software. Note that an information handling system can include an integrated circuit or a board-level product having portions thereof that can also be any combination of hardware or software.

Devices or programs that are in communication with one another need not be in continuous communication with each other, unless expressly specified otherwise. In addition, devices or programs that are in communication with one another may communicate directly or indirectly through one or more intermediaries.

Two or more information handling systems can be coupled together to form a network such that individual information handling systems in the network can exchange information with each other. A non-limiting example of a network includes a local area network (LAN), a metropolitan area network (MAN), a storage area network (SAN), a wide area network (WAN), a wireless local area network (WLAN), a virtual private network (VPN), an intranet, the Internet, any other appropriate network architecture or system, or any combination thereof. The information handling systems on a network can include storage devices, file servers, print servers, personal computers, laptop computers, personal data assistants, media content players, other devices capable of being coupled to a network, or any combination thereof. A network can include other elements that facilitate the exchange of information between the individual information handling systems.

Embodiments discussed below describe, in part, distributed computing solutions that manage all or part of a communicative interaction between networked information handling systems. A elements of the network may be a piece of hardware (e.g., an information handling system, a hub, a switch, a router, another piece of hardware, or any combination thereof), software, firmware, middleware, another component of a computing system, or any combination thereof. In this context, a communicative interaction may be intending to send information, sending information, requesting information, receiving information, receiving a request for information, or any combination thereof. As such, a communicative interaction could be unidirectional, bi-directional, multi-directional, or any combination thereof. In some circumstances, a communicative interaction could be relatively complex and, involve two or more network elements. For example, a communicative interaction may be "a conversation," or series of related communications between a client and a server—each network element sending and receiving information to and from the other. Whatever form the communicative interaction takes, the network elements involved need not take any specific form.

A communicative interaction can include management information and content information. As used herein, the term "management information" with respect to a communicative interaction, is intended to mean information used to direct, manage, or other wise control a network. As such, management information can be used by the network elements to identify the particular network elements that are coupled to the network, set-up and initialize the network elements, control routing of communicative interactions, perform another suitable function, or any combination thereof. A non-limiting example of management information includes a router set-up command, data packet header information (e.g., addresses), an Internet Control Message Protocol (ICMP) message (e.g., echo request, router discovery, timestamp, etc.), other suitable management information, or any combination thereof.

The term "content information" with respect to a communicative interaction, is intended to mean information that is not management information. Thus, content information can include information that is targeted to one or more network element, is received by the targeted elements to be processed or manipulated, displayed, stored, forwarded to another network element, perform another suitable function, or any combination thereof. A non-limiting example of content information includes most data packet payload information, a media file (e.g., audio, video, or picture files, etc.), a textual file (e.g., e-mail, word processing files, etc.), a program, a data file (e.g., spreadsheet or database file, etc.), another suitable form of content information, or any combination thereof.

In the description below, a flow-charted technique may be described in a series of sequential actions. The sequence of the actions, and the party performing the steps may be freely changed without departing from the scope of the teachings. Actions may be added, deleted, or altered in several ways. Similarly, the actions may be re-ordered or looped. Further, although processes, methods, algorithms, or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features, but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and resources described herein. This is done merely for convenience, and to give a general sense of the scope of the invention. This description should be read to include one, or at least one, and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only, and not intended to be limiting.

To the extent not described herein, many details regarding specific materials, processing acts, and circuits are conventional, and may be found in textbooks and other sources within the computing, electronics, and software arts.

An information handling system and method of using it are described below. An exemplary, non-limiting system description is described before addressing methods of using it. Some of the functionality of modules within the system is described with the system. The utility of the system and its modules will become more apparent with the description of the methods that follow the description of the system and modules.

Figure 1:
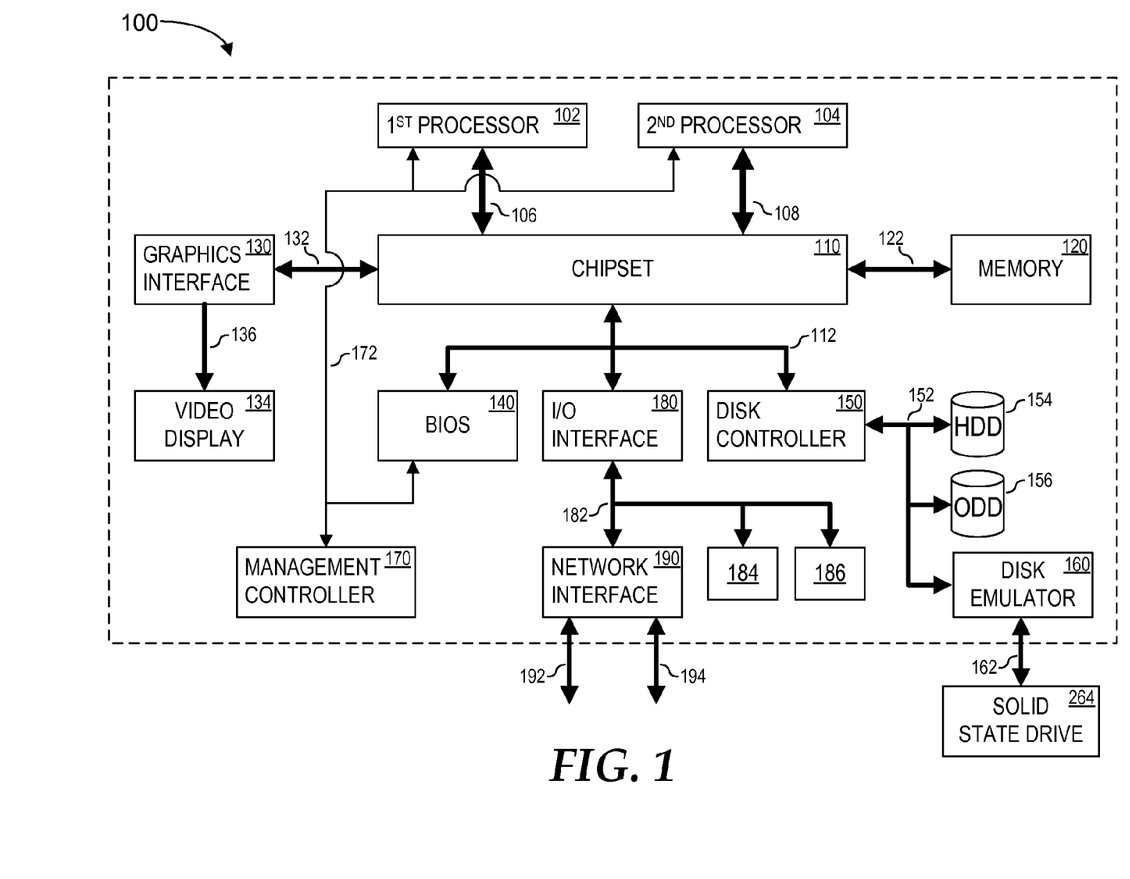
FIG. 1 is a functional block diagram illustrating an exemplary embodiment of an information handling system.

FIG. 1 illustrates a functional block diagram of an exemplary embodiment of an information handling system, generally designated as 100. The information handling system 100 can include a processor 102 coupled to a host bus 106, and can further include one or more additional processors, generally designated as an $n^{th}$ processor 104, coupled to a host bus 108. The processor 102 can be coupled to a chipset 110 via the host bus 106 and the $n^{th}$ processor 104 can be coupled to the chipset 110 via the host bus 108. The chipset 110 can support the processors 102 through 104, allowing for simultaneous processing by the processors 102 through 104, and can support the exchange of information within the information handling system 100 during multiple processing operations. In an aspect, the chipset 110 can function to provide access to the processor 102 using host bus 106, and the $n^{th}$ processor 104 using the host bus 108. In another aspect, the chipset 110 can include a dedicated bus (not illustrated) to transfer data between the processor 102 and the $n^{th}$ processor 104.

The information handling system 100 can include a memory 120 coupled to a memory bus 122. In accordance with an aspect, the chipset 110 can be referred to as a memory hub or a memory controller, where the memory 120 can be coupled to the chipset 110 via the memory bus 122. For example, the chipset 110 can include an Accelerated Hub Architecture (AHA) enabled-chipset that can include a memory controller hub and an I/O controller hub. As a memory controller hub, the chipset 110 can be coupled to the host buses 106 through 108, and the memory bus 122 as individual buses, or as part of the same bus (not illustrated). The chipset 110 can also provide bus control and can handle transfers between the host buses 106 through 108, and the memory bus 122. In accordance with another aspect (not illustrated), the information handling system can include a separate memory dedicated to each processor 102 through 104. Each memory can include a memory bus coupled between each processor 102 through 104 and its dedicated memory. In accordance with yet another aspect, the chipset 110 can be generally considered an application specific chipset that provides connectivity to various buses, and integrates other system functions. The chipset 110 can also be packaged as an ASIC.

The information handling system 100 can also include a graphics interface 130 that can be coupled to the chipset 110 using the graphics bus 132. The graphics interface 130 can provide a video display output 136 to the video display 134. In one form, the graphics interface 130 can be an Accelerated Graphics Port (AGP) interface to display content within a video display 134. Other graphics interfaces (not illustrated) may also be used in addition to the graphics interface 130 if needed or desired. The video display 134 can include one or more types of video displays, such as a flat panel display or other type of display device.

The information handling system 100 can also include an I/O channel 112 connected to the chipset 110. The I/O channel 112 can include a Peripheral Component Interconnect (PCI) bus, a PCI-Extended (PCI-X) bus, a high-speed link of PCI-Express (PCIe) lanes, another industry standard or proprietary bus or link, or any combination thereof. In one embodiment, a PCI bus can be operated at approximately 66 MHz, a PCI-X bus can be operated at approximately 133 MHz, and a PCIe link can be operated at approximately 250 million bytes per second (MB/s) per lane in each direction. PCI buses, PCI-X buses, and PCIe links can be provided to comply with industry standards for connecting and communicating between various PCI, PCI-X and PCIe enabled hardware devices, respectively. The chipset 110 can include other buses in association with, or independent of, the I/O channel 112, including other industry standard buses (e.g., Industry Standard Architecture (ISA), Small Computer Serial Interface (SCSI), Inter-Integrated Circuit ($I^2C$), System Packet Interface (SPI), or Universal Serial Bus (USB), proprietary buses or any combination thereof.

The information handling system 100 can also include a basic input/output system (BIOS) module 140 that can be coupled to the I/O channel 112. In a particular embodiment, the BIOS module 140 includes BIOS code operable to detect and identify resources within the information handling system 100, provide the appropriate drivers for those resources, initialize those resources, and access those resources. In a particular embodiment, the BIOS module 140 includes Extensible Firmware Interface (EFI) code operable to detect, identify, provide drivers for, initialize and access resources within the information handling system 100.

The information handling system 100 can further include a disk controller 150 coupled to the I/O channel 112. The disk controller 150 can include a disk interface 152 that can include other industry standard buses (e.g., Integrated Drive Electronics (IDE), Parallel Advanced Technology Attachment (PATA), Serial Advanced Technology Attachment (SATA), SCSI, or USB or proprietary buses, or any combination thereof. The disk controller 150 can be coupled to one or more disk drives via the disk interface 152. Such disk drives include a hard disk drive (HDD) 154 or an optical disk drive (ODD) 156 (e.g., a Read/Write Compact Disk (R/W-CD), a Read/Write Digital Video Disk (R/W-DVD), a Read/Write mini Digital Video Disk (R/W mini-DVD), or another type of optical disk drive), or any combination thereof. The optical disk drive 166 can read a removable data storage medium (e.g., a Compact Disk (CD), a Digital Video Disk (DVD), a mini Digital Video Disk (mini-DVD), or other optical media). Additionally, the information handling system 100 can include a disk emulator 160 that is coupled to the disk interface 152. The disk emulator 160 can permit a solid-state drive 164 to be coupled to the information handling system 100 via an external interface 162. The external interface 162 can include other industry standard busses (e.g., USB or IEEE 1394 (Firewire)) or proprietary busses, or any combination thereof. Alternatively, the solid-state drive 164 can be disposed within the information handling system 100.

The information handling system 100 can further include a management controller 170 that can be coupled to the chipset 110 via a system communication bus 172, such as a control bus. The management controller 170 may be on a main circuit board (e.g., a baseboard, a motherboard, or any combination thereof), integrated onto another component such as the chipset 110, in another suitable location, or any combination thereof. Although not illustrated, another resource, such as the processors 102 or 104, the memory 120, the graphics interface 130, the video display 134, the I/O interface 140, or the disk controller 150, or any combination thereof, can be coupled to the management controller 170. Commands, communications, or other signals may be sent to or received from the management controller 170 by any one or any combination of resources previously described. The management controller 170 can be part of an integrated circuit or a chip set within the information handling system 100.

The information handling system 100 can also include an I/O interface 180 that can be connected to the chipset 110 via the I/O channel 112. The I/O interface 180 can be coupled to a peripheral channel 182 that can be of the same industry standard or proprietary bus or link architecture as the I/O channel 112, or of a different industry standard or proprietary bus or link architecture than the I/O channel 112. As such, the I/O interface 180 can extend the I/O channel 112 capacity when the peripheral channel 182 is the same as the I/O channel 112, or translate information from a type suitable to the industry standard or proprietary bus or link architecture of the I/O channel 112 to a type suitable to a different industry standard or proprietary bus or link architecture, and vise versa, when the peripheral channel 182 is different than the I/O channel 182. Other I/O interfaces (not illustrated) may also be used in addition to the I/O interface 180, if needed or desired.

The peripheral channel 182 can include a bus structure that allows the installation and coupling of additional resources 184 through 186 to the information handling system. In accordance with an aspect (not illustrated), the peripheral channel 182 can also include one or more point-to-point links to the additional resources 184 through 186. The external resources 184 through 186 can include a data storage system, a graphics interface, another suitable resource or any combination thereof. The additional resources 184 through 186 can be on a main circuit board, on separate circuit boards or add-in cards disposed within the information handling system 100, devices that are external to the information handling system 100, or any combination thereof.

The information handling system 100 can also include a network interface device 190 that is coupled to the I/O interface 180 via the peripheral channel 182. The network interface device 190 may be a network interface card (NIC) disposed within the information handling system 100, on a main circuit board (e.g., a baseboard, a motherboard, or any combination thereof), integrated onto another component such as the chipset 110, in another suitable location, or any combination thereof. The network interface device 190 can include a network channel 192 and a network channel 194. The network interface device 190 can also include additional network channels (not illustrated). In accordance with an aspect, the network channels 192 and 194 are of a different industry standard or proprietary bus or link architecture than the peripheral channel 182, and the network interface device 190 can translate information from a type suitable to the industry standard or proprietary bus or link architecture of the peripheral channel 182 to a type suitable to the industry standard or proprietary bus or link architecture of the network channels 192 and 194, and vise versa. The network channels 192 and 194 can be of industry standard architecture (e.g., InfiniBand, Fibre Channel, Gb Ethernet, etc.), proprietary channel architecture, or any combination thereof. Other network interface devices (not illustrated) may also be used in addition to the network interface device 190, if needed or desired. The network channels 192 and 194 can be coupled to network resources (not illustrated). The network resource can include another information handling system, a data storage system, another network, a grid management system, another suitable resource or any combination thereof.

Figure 2:
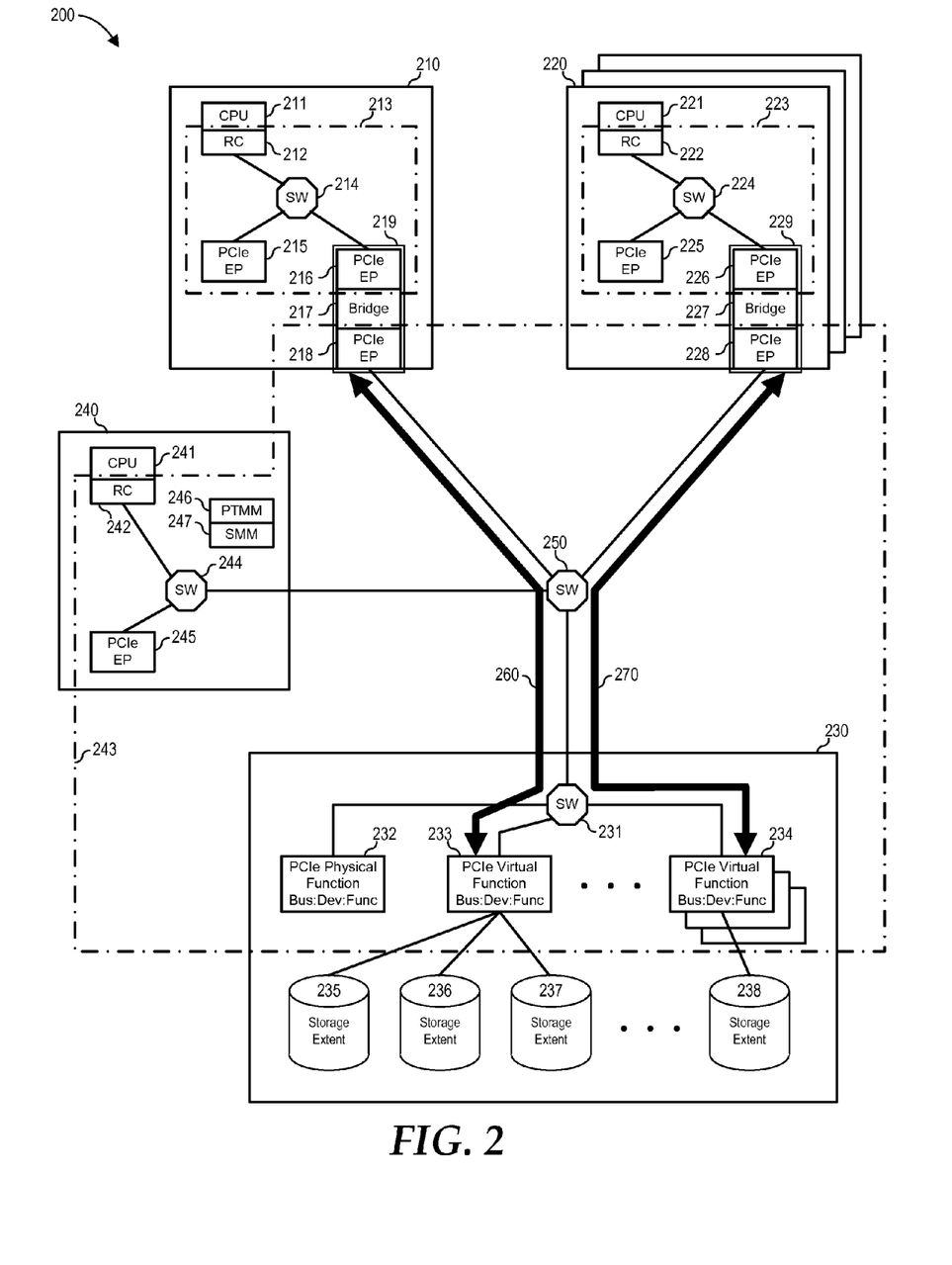
FIG. 2 is a functional block diagram illustrating an embodiment of a server-based system.

FIG. 2 illustrates an embodiment of a server-based system 200. Server-based system 200 includes a server 210, one or more additional server 220, a storage resource 230, a management controller 240, and a switch 250. In a non-limiting embodiment, server-based system 200 is arranged such that servers 210 and 220, storage resource 230, and management controller 240 are separate information handling systems 100 that share common interconnections or other couplings, as described below. In another non-limiting embodiment, server-based system 200 is arranged such that servers 210 and 220, storage resource 230, and management controller 240 are rack-mounted information handling systems 100 that share common interconnections and power delivery. In yet another non-limiting embodiment, server-based system 200 is arranged such that servers 210 and 220, storage resource 230, and management controller 240 share a common chassis, and where servers 210 and 220 are server blades, storage resource 230 is a storage blade, and management controller 240 is a chassis management controller. Further, server-based system 200 can be arranged in another configuration, or in any combination of the above configurations.

Each of servers 210 and 220 function similarly to information handling system 100. In the embodiment illustrated in FIG. 2, each of servers 210 and 220 include a processor (CPU) 211 and 221, a PCIe root complex (RC) 212 and 222, a PCIe switch 214 and 224, three PCIe end points (EP) 215, 216, 218, 225, 226, and 228, and a bridge 217 and 227. EPs 216 and 218, and bridge 217 together make up a PCIe host bridge adapter (PHBA) 219, and EPs 226 and 228, and bridge 227 together make up a PHBA 229. Hereinafter, components, the interactions between components, and the functions of components of server 210 will be described. Unless otherwise specifically noted, the corresponding components, the interactions between components, and the functions of components of server 220 will be similar to those of server 210. In another embodiment, not illustrated, servers 210 and 220 may not include PCIe switches 214 and 224. For example, RCs 212 and 222 can include switches that perform similarly to PCIe switches 214 and 224.

CPU 211 may be similar to processors 102 and 104. RC 212 is coupled to CPU 211, and may function similarly to chipset 110, or to I/O interface 180. RC 212 forms a definitional boundary of a PCIe domain 213 that includes switch 214 and EPs 215 and 216. As such, RC 212 is coupled to switch 214, and switch 214 is coupled to EPs 215 and 216. EP 215 can function as a host bus adapter, providing a network interface similar to network interface 190, or a storage interface similar to disk controller 150. EP 216 is coupled to bridge 217, which is in turn coupled to EP 218. EP 218 is coupled to switch 250. The functionality of bridge 217 and EPs 216 and 218 will be further described below.

Storage resource 230 includes a switch 231, a physical function 232, a virtual function 233, one or more additional virtual functions 234, storage extents 235, 236, and 237, and one or more additional storage extent 238. Switch 231 is coupled to switch 250. In another embodiment, not illustrated, physical function 232 and virtual functions 233 and 234 are coupled such that information from physical function 232 and virtual functions 233 and 234 is routed to switch 250 through a virtual switch, another routing mechanism, or any combination thereof. Virtual function 233 is coupled to storage extents 235, 236, and 237. Virtual function 234 is coupled to one or more of storage extent 238. In a particular embodiment, virtual functions 233 and 234 are created in storage resource 230 in accordance with the PCI Special Interest Group (PCI-SIG) Single Root I/O Virtualization and Sharing 1.0 specification (SR-IOV), and storage resource 230 is an SR-IOV compliant device. After reading this specification, skilled artisans will appreciate that physical function 232 can operate as a physical PCIe end-point, and that virtual functions 233 and 234 can operate as virtual PCIe end-points. Storage extents 235 through 238 include physical hard disk drives, logical disks, other physical or virtual storage devices, or any combination thereof. Each storage extent 235, 236, 237, and 238 includes a unique identifier. A non-limiting example of a unique identifier is hard disk drive virtual product data, a world wide name, another unique identifier, or any combination thereof.

Management controller 240 functions similarly to information handling system 100. In the embodiment illustrated in FIG. 2, management controller 240 includes a CPU 241, a PCIe RC 242, a PCIe switch 244, a PCIe EP 245, a primary transport management module (PTMM) 246, and a storage management module (SMM) 247. CPU 241 may be similar to processors 102 and 104. RC 242 is coupled to CPU 241, and may function similarly to chipset 110, or to I/O interface 180. RC 242 forms a definitional boundary of a PCIe domain 243 that includes switches 244, and 250, EPs 218, 228, and 245, physical function 232, and virtual functions 233 and 234. As such, RC 242 is coupled to switch 244, switch 244 is coupled to EP 245 and to switch 250. In this way, PCIe domain 243 couples together the various elements of server-based system 200 (e.g., servers 210 and 220, storage resource 230, and management controller 240). EP 245 can function as a host bus adapter, providing a network interface similar to network interface 190, or a storage interface similar to disk controller 150.

PTMM 246 functions to create, destroy, and otherwise manage virtual functions 233 and 234 on storage resource 230, and to map virtual functions 233 and 234 to servers 210 and 220 as described below. SMM 247 functions to map subsets of storage extents 235 through 238 to virtual functions 233 and 234 as described below. PTMM 246 and SMM 247 represent functional blocks in management controller 240. In a particular embodiment, PTMM 246 or SMM 247 is implemented as software or firmware code that is executable by CPU 240 that directs interactions on PCIe domain 243 to perform the desired functions. As such, the mapping functions of PTMM 246 or SMM 247 can include a table or other data structure residing in a system memory area (not illustrated) in management controller 240. In another embodiment, PTMM 246 or SMM 247 is implemented as hardware that directs interactions on PCIe domain 243 to perform the desired functions. In another embodiment, PTMM 246 or SMM 247 is implemented as a combination of hardware, software and firmware.

Within a particular PCIe domain 213, 223, or 243, the associated root complex 212, 222, or 242 generally controls the flow of information. For example, in PCIe domain 213, EPs 215 and 216 can be accessed by RC 212 to send or receive information in the form of data transfers, or device set-up and control information. EPs 215 and 216 are each uniquely identified as residing on a particular bus within PCIe domain 213, as being a particular EP 215 or 216 on that particular bus, and as including one or more functions within that particular EP 215 or 216. As such, information exchanges between RC 212 and EPs 215 and 216 are directed to the desired EP 215 or 216 by reference to a particular bus, to a particular device on that bus, and to a particular function on that device. This scheme is annotated as "bus:dev:func."

For example, assume EPs 215 and 216 reside on bus 01, EP 215 is device 01, and EP 216 is device 02. On each EP 215 and 216, function 01 corresponds to a send data function, function 02 corresponds to a receive data function, function 03 corresponds to a send control information function, and function 04 corresponds to a receive control information function. When server 210 is to receive data from EP 215, RC 212 accesses bus 01, device 01, and function 02 (e.g., 01:01:02), and the data passes through switch 214 and RC 212 to be processed by CPU 211. Likewise, when server 210 is to send control information to EP 216, RC 212 access bus 01, device 02, and function 03 (e.g., 01:02:03), and sends the data through switch 214 and EP 216. Further, if server 210 is to transfer data received from EP 216, and send it out to EP 215, CPU 211 can first direct RC 212 to receive the data from EP 216 by accessing bus 01, device 02, and function 02 (e.g., 01.02.02). CPU 211 can then buffer or otherwise store the data, and direct RC 212 to send the data to EP 215 by accessing bus 01, device 01, and function 01 (e.g., 01.01.01). In this example, the data passes through switch 214 two times: first when the data is being receive from EP 216, and second when the date is being sent to EP 215. Furthermore, the data transfer can use CPU 211 to store or buffer the data.

In a particular embodiment, PCIe domains 213, 223, and 243 support peer-to-peer operations. In a peer-to-peer operation, end points within a particular domain can directly access each other. For example, in PCIe domain 213, if server 210 is to transfer data received from EP 216, and send it out on EP 215, CPU 211 can direct RC 212 to send control information to EP 216 by accessing bus 01, device 02, and function 04 (e.g., 01.02.04). The control information can instruct EP 216 to perform a peer-to-peer data transfer to EP 215. Then EP 216 sends the data directly to EP 215 by accessing bus 01, device 01, and function 01 (e.g., 01.01.01). In this way, peer-to-peer operation reduces the demand on CPU 211 and on RC 212.

PHBA 219 operates to permit data transfers between PCIe domains 213 and 243, and PHBA 229 operates to permit data transfers between PCIe domain 223 and 243. Components, the interactions between components, and the functions of components of PHBA 219 will be described. Unless otherwise specifically noted, the corresponding components, the interactions between components, and the functions of components of PHBA 229 will be similar to those of PHBA 219. In a non-limiting example, PHBAs 219 and 229 can be in the form of one or more integrated devices included in server 210, in the form of an add-in card in server 210, or any combination thereof.

EPs 216 and 218 reside in PCIe domains 213 and 243, respectively. EP 216 can share data transfers with other elements in PCIe domain 213 and with bridge 217, and EP 218 can share data transfers with other elements in PCIe domain 243 and with bridge 217. In domain 213, EP 216 is accessible by RC 212 and EP 215 (e.g., in peer-to-peer mode), and can access RC 212 and EP 215 (e.g., in peer-to-peer mode). In domain 243, EP 218 is accessible by RC 243, and in peer-to-peer mode by EPs 228 and 245, physical function 232, and virtual functions 233 and 234, and EP 218 can access RC 243, and in peer-to-peer mode can access EPs 228 and 245, physical function 232, and virtual functions 233 and 234. Because both EPs 216 and 218 can share data transfers with bridge 217, PHBA 219 permits data transfers between PCIe domains 213 and 243. When data is received by EP 216, it is transferred by bridge 217 to EP 218, and EP 218 sends the data to the target of the data (e.g., server 220, storage resource 230, or management controller 240). Similarly, when data is received by EP 218, it is transferred by bridge 217 to EP 216, and EP 216 sends the data to the target of the data (e.g., RC 213, or EP 215).

The presence of PHBAs 219 and 229 permit devices in PCIe domains 213 and 223, respectively, to access storage resource 230 within PCIe domain 243. When RC 242 detects EP 218 in PCIe domain 243, PTMM 246 determines that EP 218 is part of PHBA 219. In particular, PTMM 246 can read fields in PCIe configuration space in EP 218 which defines the device type of EP 218. For example, PTMM 246 can read the Device Identification field, the Vendor Identification field, the Class Code field, another field, or any combination thereof. PTMM 246 then creates virtual function 233 on storage resource 230, and sends the bus, device, and function (e.g., the bus:dev:func address) of virtual function 233 to PHBA 219, thus creating a communication channel 260 between server 210 and storage resource 230. Thereafter, server 210 utilizes communication channel 260 by initiating peer-to-peer transactions between EP 218 and virtual function 233 to store or retrieve data from storage resource 230. Similarly, when RC 242 detects EP 228, PTMM 246 determines that EP 228 is part of PHBA 229, creates virtual function 234 on storage resource 230, and sends the bus, device, and function (e.g., the bus:dev:func address) of virtual function 234 to PHBA 229, creating a communication channels 270 between server 220 and storage resource 230 and server 220 thereafter store and retrieve data from storage resource 230 through communication channels 270 by initiating a peer-to-peer transaction between EP 228 and virtual function 234.

In one embodiment, detection of PHBAs 219 and 229 occurs during the initialization and boot process of management controller 240. In this case, PHBAs 219 and 229 include an option ROM that includes code that is executed by management controller 240 when RC 242 initializes PCIe domain 243. In another embodiment, a message protocol is defined between PTMM 246 and PHBAs 219 and 229 that allows servers 210 and 220 to request access to storage resource 230 after the initialization and boot process of management controller 240. In this case, PHBAs 219 and 229 include firmware code that is executed when servers 210 or 220 request access to storage resource 230. This embodiment permits changing or replacing of server-based system 200 components such as either servers 210 and 220, or PHBAs 219 and 229 while server-based system 200 is operating, (e.g., without shutting off the power to server-based system 200). In another embodiment, PHBAs 219 and 229 include both an option ROM and firmware as described above.

When communication channels 260 and 270 are created between servers 210 and 220, respectively, and storage resource 230, SMM 247 assigns subsets of storage extents 235 through 238 to virtual functions 233 and 234. For example, storage extents 235, 236, and 237 are mapped to virtual function 233, and storage extent 238 is mapped to virtual function 234. In one embodiment, mapping is performed such that a particular subset of storage extents 235 through 238 are mapped to a particular server 210 or 220 based upon the physical coupling between PCIe domain 243 and the particular server 210 or 220. A non-limiting example includes mapping a particular subset of storage extents 235 through 238 to the server 210 or 220 coupled to a particular port of switch 250, to a particular slot on a blade server chassis, another physical coupling, or any combination thereof. In another embodiment, mapping is performed such that a particular subset of storage extents 235 through 238 are mapped to a particular server 210 or 220 based upon a request from server 210 or 220 to have access to specific storage extents 235, 236, 237, or 238. For example, a server 210 or 220 can request access to the storage extent 235, 236, 237, or 238 with a particular unique identifier. A non-limiting example of a unique identifier is an Internet-SCSI qualified name, a Fibre Channel world wide name, a vital product data identification, another unique identifier, or any combination thereof. In yet another embodiment, SMM 247 automatically maps a particular server 210 or 220 to a subset of storage extents 235 through 238.

In an embodiment of the present disclosure, not illustrated, the functionality of management controller 240 is moved elsewhere in server system 200. For example, the functionality of management controller 240 can be performed by server 210. Here, CPU 211 can be coupled not only to a root complex similar to RC 212, but also to another root complex similar to RC 242. In this example, server 210 can perform the tasks of the management controller 240, including PTMM 246 and SMM 247, in addition to the functions normally performed by server 210. In another example, storage resource 230 can include a CPU and a root complex (e.g., when storage resource 230 is a storage blade server), and can include the functionality of management controller 240. Here, storage blade 230 can perform the tasks of management controller 240, including PTMM 246 and SMM 247, in addition to the functions normally performed by storage resource 230.

Figure 3:
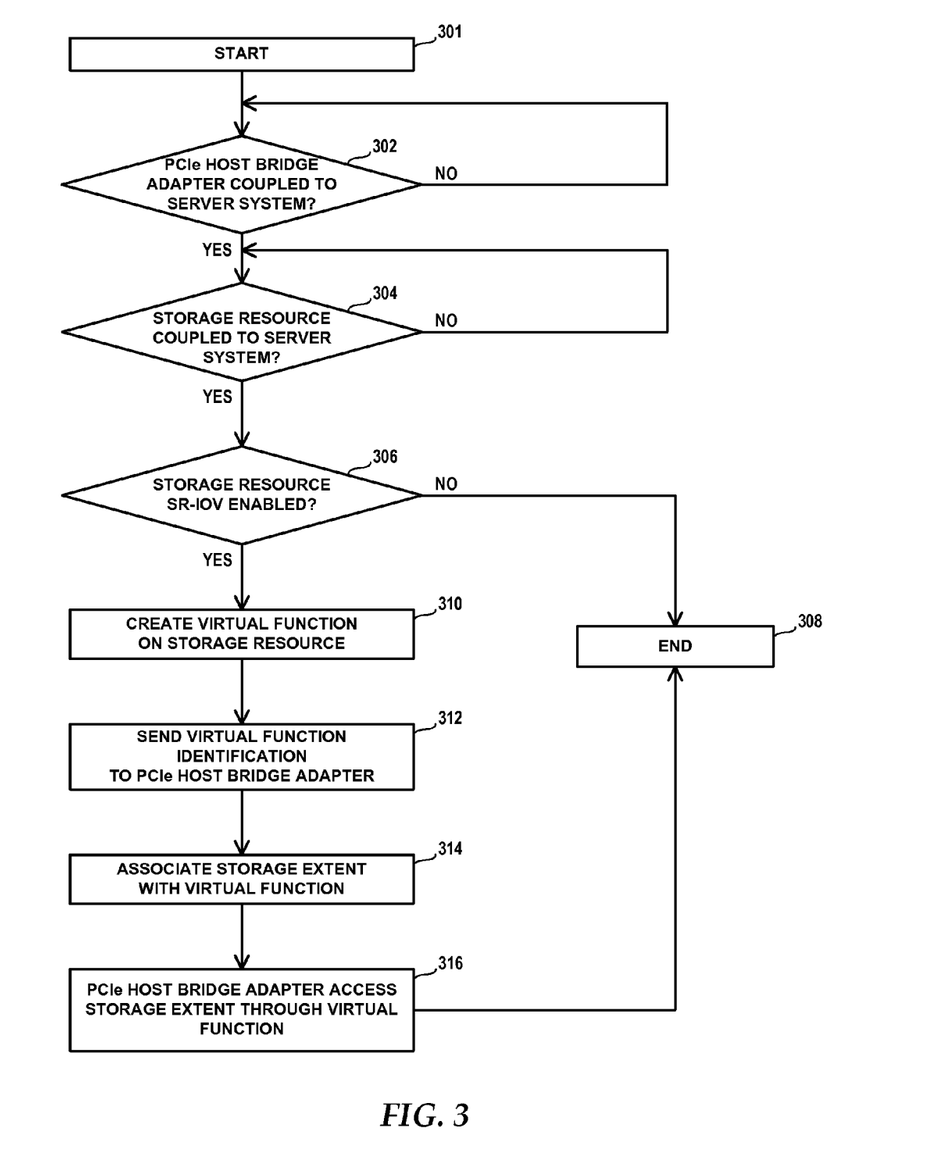
FIG. 3 is a flow chart illustrating a method of sharing storage resources on a server-based system.

FIG. 3 illustrates a method of sharing storage resources on a server-based system in a flow chart form, in accordance with an embodiment of the present disclosure. The method starts at block 301. A decision is made as to whether or not a PCIe host bridge adapter is coupled to a server-based system at decision tree 302. If not (the "NO" branch of decision tree 302), processing returns to decision tree 302, looping until a PCIe host bridge adapter is coupled to the server-based system. When a PCIe host bridge adapter is coupled to the server-based system, such as when server 210 is installed in server-based system 200 (the "YES" branch of decision tree 302), a decision is made as to whether or not a storage resource is coupled to the server-based system at decision tree 304. If not (the "NO" branch of decision tree 304), processing returns to decision tree 304, looping until a storage resource is coupled to the server-based system. When a storage resource is coupled to the server-based system, such as when storage resource 230 is installed in server-based system 200 (the "YES" branch of decision tree 304), a decision is made as to whether or not the storage resource is an SR-IOV enabled storage resource at decision tree 306. If not (the "NO" branch of decision tree 306), processing ends at block 308.

If the storage resource is an SR-IOV enabled storage resource (the "YES" branch of decision tree 306), a virtual function is created on the storage resource in block 310. For example, PTMM 246 can create virtual function 233 on storage resource 230. The virtual function identification is sent to the PCIe host bridge adapter in block 312. For example, PTMM 246 can send the bus, device, and function (e.g., the bus:dev:func address) of virtual function 233 to PHBA 219. A storage extent within the storage resource is associated with the virtual function in block 314. For example, SMM 247 can associate storage extents 235, 236, and 237 with virtual function 233. The PCIe host bridge adapter accesses the storage extent through a peer-to-peer transaction with the virtual function in block 316, and processing ends at block 308. For example, PHBA 219 can perform peer-to-peer data send and data receive transactions with virtual function 233 to store and retrieve data from storage extents 235, 236, and 237.

After reading this specification, skilled artisans will appreciate that embodiments of the present disclosure can permit multiple information handling systems to access storage resources using an SR-IOV technology. In a particular embodiment, the creation of multiple channels to an SR-IOV enabled storage resource in a server-based system is enabled by the addition of a PCIe domain that is separate from the PCIe domains within the servers, and by the inclusion of PHBAs in the servers. Skilled artisans will further appreciate that prior art implementations of multiple information handling systems using SR-IOV technology do not permit sharing of storage resources between the information handling systems because the multiple root complexes in the servers have no way to share resources.

In a first aspect, a network includes a management module with a first root complex, a first server with a first endpoint coupled to the first root complex, and a second server with a second root complex, a second endpoint coupled to the second root complex, a third endpoint coupled to the first root complex, and a bridge coupled to the second endpoint and to the third endpoint. In an embodiment of the first aspect, the first server includes a fourth endpoint. The management module can also operate to create the fourth endpoint as a virtual function. Further, the first server can include multiple storage extents. In another embodiment, the management module is operable to map a first subset of the multiple storage extents to the fourth endpoint. The management module can also operate to map the fourth endpoint to the third endpoint. Moreover, the second server can access the first subset of the multiple storage extents through the second endpoint.

In another embodiment of the first aspect, the network includes a third server comprising with a third root complex, a fifth endpoint coupled to the third root complex, a sixth endpoint coupled to the first root complex, and a bridge coupled to the fifth endpoint and to the sixth endpoint, the storage blade includes a seventh endpoint, the management module further operates to create the seventh endpoint as a virtual function, to map a second subset of the multiple storage extents to the seventh endpoint, and to map the seventh endpoint to the sixth endpoint, and the second server blade accesses the second subset of the multiple storage extents through the fifth endpoint. The first server can include the management module. Alternatively, the second server can include the management module. Further, the management module can be separate from the first server and the second server.

In a second aspect, a method includes discovering a first PCIe host bridge adapter (PHBA) and a storage resource coupled to multiple storage extents in a PCIe domain, then creating a first virtual function on the storage resource and sending a first identifier for the first virtual function to the first PHBA. In an embodiment of the second aspect, the method includes associating a particular storage extent to the first virtual function. In another embodiment, the method includes accessing the particular storage extent from the first PHBA. In yet another embodiment, the method includes discovering a second PHBA in the PCIe domain, and then creating a second virtual function on the storage resource and sending a second identifier for the second virtual function to the second PHBA. In still another embodiment, the method includes associating a different particular storage extent to the second virtual function. In yet another embodiment, the method includes accessing the different particular storage extent from the second PHBA.

In a third aspect, a network interface device includes a first PCIe endpoint that is operably coupleable to a first PCIe root complex, a second PCIe endpoint that is operably coupleable to a second PCIe root complex, and a bridge that couples the first PCIe endpoint with the second PCIe endpoint. In an embodiment of the third aspect, the bridge operates to communicate information received at the first PCIe endpoint on the second PCIe endpoint, and communicate information received at the second PCIe endpoint on the first PCIe endpoint. In another embodiment, the network interface device is adaptable to be included in a server.

Note that not all of the activities described above in the general description or the examples are required, that a portion of a specific activity may not be required, and that one or more further activities may be performed, in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features described herein in the context of separate embodiments for the sake of clarity, may also be provided in combination in a single embodiment. Conversely, various features that are, for brevity, described in the context of a single embodiment, may also be provided separately, or in any sub-combination. Further, reference to values states in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur, or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A network comprising:
   a management module comprising a first root complex;
   a first server comprising a first endpoint coupled to the first root complex, wherein the first endpoint and the first root complex are located within a first PCIe domain, and wherein the first PCIe domain is configured to enable peer-to-peer transactions only between endpoints in the first PCIe domain; and
   a second server comprising:
      a second root complex;
      a second endpoint coupled to the second root complex;
      a third endpoint coupled to the first root complex and to the first endpoint, wherein the third endpoint is located within the first PCIe domain and sends data to the first endpoint via a peer-to-peer transaction,
      a PCIe host bridge adapter including a bridge, the second endpoint, and the third endpoint, the bridge to transfer data between the first PCIe domain and a second PCIe domain by the bridge being adapted to receive data from one of the second and third endpoints and to transfer the data to the other endpoint, wherein the second endpoint is located within the second PCIe domain, and wherein the bridge is not in either the first PCIe domain or the second PCIe domain.

2. The network of claim 1, wherein the first server further comprises a fourth endpoint.

3. The network of claim 2, wherein the management module is operable to create the fourth endpoint as a virtual function.

4. The network of claim 2, wherein the first server further comprises a plurality of storage extents.

5. The network of claim 4, wherein the management module is operable to map a first subset of the plurality of storage extents to the fourth endpoint.

6. The network of claim 5, wherein the management module is further operable to map the fourth endpoint to the third endpoint.

7. The network of claim 6, wherein the second server accesses the first subset of the plurality of storage extents through the second endpoint.

8. The network of claim 7, further comprising:
a third server comprising:
  a third root complex;
  a fifth endpoint coupled to the third root complex;
  a sixth endpoint coupled to the first root complex; and
  a bridge coupled to the fifth endpoint and to the sixth endpoint;
wherein the first server further comprises a seventh endpoint;
wherein the management module is further operable to:
  create the seventh endpoint as a virtual function;
  map a second subset of the plurality of storage extents to the seventh endpoint; and
  map the seventh endpoint to the sixth endpoint; and
wherein the second server accesses the second subset of the plurality of storage extents through the fifth endpoint.

9. The network of claim 1, wherein the first server further comprises the management module.

10. The network of claim 1, wherein the second server further comprises the management module.

11. The network of claim 1, wherein the management module is separate from the first server and the second server.

12. A network interface device comprising:
a first PCIe endpoint that is operably coupleable to a first PCIe root complex, wherein the first PCIe endpoint and the first PCIe root complex are in a first PCIe domain, wherein the first PCIe domain is configured to enable the first peer-to-peer transaction only between endpoints in the first PCIe domain;
a second PCIe endpoint that is operably coupleable to a second PCIe root complex, wherein the second PCIe endpoint and the second PCIe root complex are in a second PCIe domain, wherein the second PCIe domain is configured to enable the second peer-to-peer transaction only between endpoints in the second PCIe domain;
a third PCIe endpoint coupled to the first root complex and to the first endpoint, wherein the third endpoint is located within the first PCIe domain and sends data to the first endpoint via a peer-to-peer transaction; and
a PCIe host bridge adapter including a bridge, the first PCIe endpoint, and the second PCIe endpoint, the bridge to transfer data between the first PCIe domain and the second PCIe domain by the bridge being adapted to receive data from one of the first and second endpoints and to transfer the data to the other endpoint, and wherein the bridge is not in either the first PCIe domain or the second PCIe domain.

13. The network interface device of claim 12, wherein the bridge is operable to:
communicate information received at the first PCIe endpoint on the second PCIe endpoint; and
communicate information received at the second PCIe endpoint on the first PCIe endpoint.

14. The network interface device of claim 13, wherein the network interface device is adaptable to be included in a server.

* * * * *